(12) United States Patent
Ferrari et al.

(10) Patent No.: US 8,516,194 B2
(45) Date of Patent: Aug. 20, 2013

(54) SYSTEMS AND METHODS FOR CACHING DATA WITH A NONVOLATILE MEMORY CACHE

(75) Inventors: Giuseppe Ferrari, Naples (IT); Procolo Carannante, Monte di Procida (IT); Angelo Di Sena, Arzano (IT); Fabio Salvati, Montoro Inferiore (IT); Anna Sorgente, Marigliano (IT)

(73) Assignee: Micron Technology, Inc., Boise, ID (US)

( * ) Notice: Subject to any disclaimer, the term of this patent is extended or adjusted under 35 U.S.C. 154(b) by 218 days.

(21) Appl. No.: 12/951,604

(22) Filed: Nov. 22, 2010

(65) Prior Publication Data

US 2012/0131261 A1 May 24, 2012

(51) Int. Cl.
*G06F 13/00* (2006.01)

(52) U.S. Cl.
USPC ............................ 711/119; 711/129; 711/144

(58) Field of Classification Search
USPC ................... 711/103, 119, 129, 144
See application file for complete search history.

(56) References Cited

U.S. PATENT DOCUMENTS

| | | | |
|---|---|---|---|
| 2009/0222617 A1* | 9/2009 | Yano et al. | 711/103 |
| 2010/0037005 A1* | 2/2010 | Kim et al. | 711/103 |
| 2011/0238899 A1* | 9/2011 | Yano et al. | 711/103 |
| 2012/0084525 A1* | 4/2012 | Jegu et al. | 711/163 |

* cited by examiner

*Primary Examiner* — Reba I Elmore
(74) *Attorney, Agent, or Firm* — Knobbe Martens Olson & Bear LLP

(57) ABSTRACT

Apparatus and methods for caching data are disclosed. Data is stored in a non-sub-block accessible nonvolatile memory, such as a NAND flash. A portion of the stored data is cached in a cache implemented using phase change memory using a sub-block accessible address.

14 Claims, 6 Drawing Sheets

SYSTEMS AND METHODS FOR CACHING DATA WITH A NONVOLATILE MEMORY CACHE

BACKGROUND

1. Field

Subject matter disclosed herein relates to sub-block accessible cache memory.

2. Information

Memory devices are employed in many types of electronic devices, such as computers, cell phones, PDA's, data loggers, and navigational equipment, just to name a few examples. Among such electronic devices, various types of nonvolatile memory devices may be employed, such as NAND or NOR flash memories, SRAM, DRAM, and phase-change memory, just to name a few examples. In general, writing or programming processes may be used to store information in such memory devices, while a read process may be used to retrieve stored information.

In addition to a main memory, a computing system may incorporate cache memory to store data so that future requests for such data may be retrieved relatively fast. Information stored within cache memory may comprise data that has been computed earlier and/or may comprise duplicate data stored elsewhere, such as in main memory, for example. If requested data is contained in cache memory (cache hit), the requested data may be retrieved by reading the cache memory, in a relatively fast process. On the other hand, if requested data is not contained in cache memory (cache miss), the requested data may need to be recomputed and/or fetched from its original storage location, which are comparably slow processes.

BRIEF DESCRIPTION OF THE FIGURES

Non-limiting and non-exhaustive embodiments will be described with reference to the following figures, wherein like reference numerals refer to like parts throughout the various figures unless otherwise specified.

DETAILED DESCRIPTION

Figure 1:
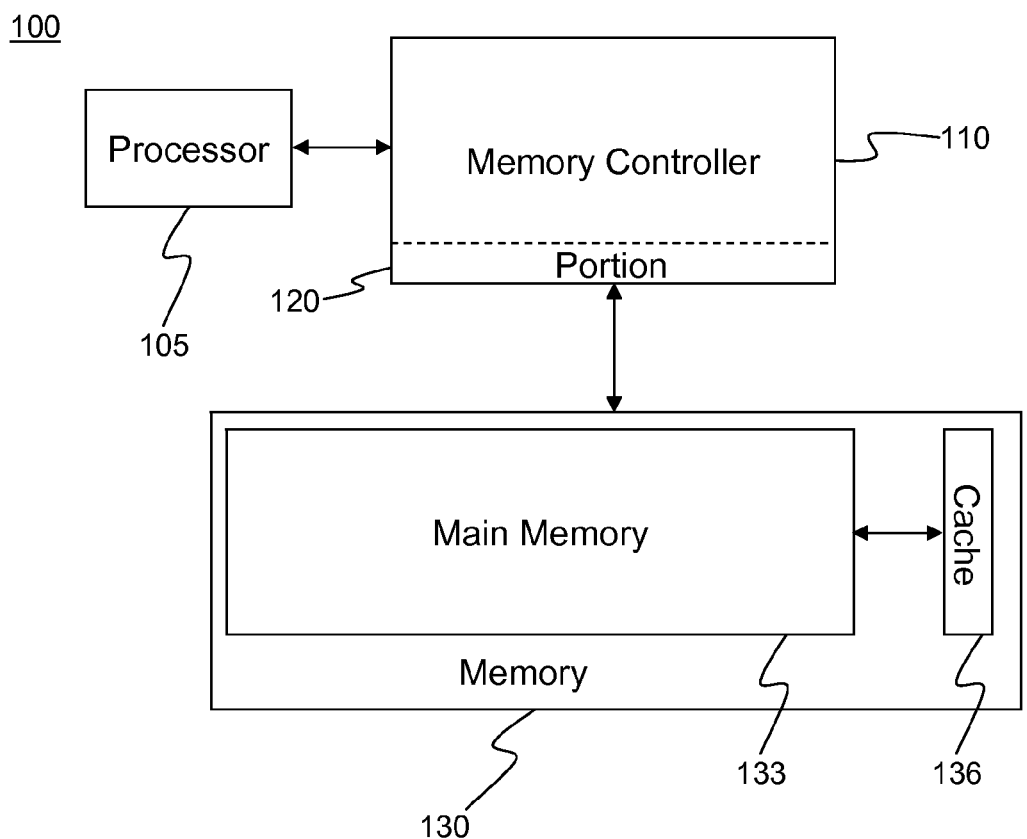
FIG. 1 is a schematic block diagram of a computing system, according to an embodiment.

Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Embodiments described herein may involve processes, techniques, electronic hardware, and/or electronic software to improve performance of a computing system incorporating a NAND or NAND-based device by using a smaller but faster non-volatile memory (e.g., phase change memory (PCM)) as cache of the NAND itself. For example, such a NAND-based device may comprise OneNAND™, available from Samsung Electronics of Hwasung-City, Gyeonggi-Do, Korea. The OneNAND™ device may comprise a memory that includes one or more NAND devices and is capable of exporting a different memory interface, such as a NOR-like interface, for example. However, claimed subject matter is not limited to such a NAND device, and other similar types of memory may be incorporated as well. A nonvolatile memory, such as PCM, used as a cache may provide a benefit in that cache contents need not be lost upon power down. On the other hand, powering-down volatile cache may lead to loss of data, while such volatile cache may need to be rewritten to at a subsequent system power-up.

In an implementation incorporating a NAND device and PCM, relatively frequently-used NAND pages may be duplicated (e.g., cached) on the PCM. Thus, if relatively high-level software layers are to read from or rewrite to a NAND page that has been cached in the PCM, the software may perform the read or rewrite operations on the cache, resulting in faster operation performance compared to not using a PCM cache, for example. Any of a number of techniques may be used to determine which NAND pages are relatively frequently-used, and thus which NAND pages are to be cached. For example, the number of read accesses per individual NAND page may be tracked. As a result of such tracking, NAND pages that have been read more frequently may be cached. In another example, the number of rewrite access per individual NAND page may be tracked. As a result of such tracking, NAND pages that have been written more frequently may be cached. In a particular implementation, information associated with such tracking may be stored in nonvolatile PCM cache, thus a power down event need not lead to loss of such information.

In yet another example, a relatively high level software layer may determine a selection of one or more NAND pages to be cached independently of access counting. Thus, in a particular example, such a selection may include NAND pages that are to always be cached, though claimed subject matter is not so limited. To illustrate a particular case for the latter example, a file allocation table (FAT) may be accessed relatively very frequently both in read and write, so it may be useful to maintain the FAT in a cache. Of course, any combination of such techniques to determine which NAND pages are relatively frequently-used, and thus which NAND pages are to be cached, may be used. For example, a particular technique may track both read and rewrite accesses per page and use a weighted combination of the access counts to select one or more pages to be cached, while also permanently caching some pages such as for a FAT, as described above. Of course, such details of caching pages are merely examples, and claimed subject matter is not so limited.

In one implementation, less frequently used cached pages (e.g., one or more pages, depending, at least in part, on a specific implementation) may be selected to be copied (e.g., flushed) from PCM cache to NAND main memory. Such an action, allowing a re-use of flushed space on PCM cache for new NAND pages, may be performed, for example, if PCM cache becomes full. Because PCM cache may have a smaller capacity for storage than NAND memory, not all pages in the NAND memory may be cached in PCM. Accordingly, if a new page is to be cached but a PCM cache does not have available space, less frequently used cached pages may be copied In one particular implementation, instead of moving data between NAND and PCM (e.g., during copying or flushing processes) in units of pages, as discussed above, for example, data may be so moved by more than one page at a time. For example, data may be moved by a full NAND block, wherein a NAND block may comprise 64 pages, each page being 2048 bytes wide. In another particular implementation, data to be permanently cached in PCM, such as explained above, for example, may be disassociated with space in NAND memory, since such data need not be flush to the NAND memory. Such an implementation may effectively expand available space in the NAND memory.

In an embodiment, data may be maintained in a nonvolatile, sub-block accessible cache memory. Such data may comprise information identified as being potentially accessed relatively often by a processor, for example, during program execution, though claimed subject matter is not so limited. Here, a sub-block accessible memory may comprise memory cells, for example, that need not be written in blocks and/or sectors at a time, but may be individually addressed or addressed in relatively small groups comprising one or more bits, such as bytes, words, and so on. As a counter-example, writing data to a NOR or NAND flash-type memory may involve writing to a relatively large block or page of memory cells, even if the data to be written merely requires a memory space of one or two memory cells. For example, a NAND page size may comprise 2 k bytes of memory. Also, changing a state of one or more memory cells of a sub-block accessible memory need not involve an erase operation beforehand, whereas changing a state of a block of memory cells of a non sub-block accessible memory may require an erase operation beforehand. In one implementation, a nonvolatile, sub-block accessible memory may comprise phase-change memory (PCM). Accordingly, writing data, such as cache data, to a cache PCM may involve writing merely to a number of memory cells that substantially match a memory size of data to be written.

Maintaining cache data in such a nonvolatile, sub-block accessible cache memory may provide finer-grained control of the size of cache data to be accessed. For example, such a nonvolatile, sub-block accessible cache memory may allow sub-block accessible addressing to store cache data in relatively small portions of cache memory space. Here, "sub-block accessible addressing" refers to using addresses that describe one or more bytes of memory (e.g., byte-wise addressing) as opposed to using block, sectors, pages, and/or other relatively large chunk of a memory. In contrast, a non sub-block accessible memory (e.g., NAND memory) may utilize block and/or sector addressing so that storing merely a single byte of data, for example, may involve a relatively large portion (e.g., block or sector of memory cells) of the memory. Additionally, a memory utilizing block and/or sector addressing may involve an erase process to prepare a memory block and/or sector for a subsequent write process, resulting in an increased amount of write-time compared to a sub-block accessible cache memory. Accordingly, storing and maintaining data in a nonvolatile, sub-block accessible cache memory may provide a way to improve memory space utilization of memory as well as decrease the amount of time involved in a read/write process. In one implementation, maintaining data in a nonvolatile, sub-block accessible cache memory instead of a volatile main memory may provide a way to preserve cache contents during a power down event and which may improve performance for a subsequent power up event. Noting another benefit, nonvolatile sub-block accessible cache memory may allow non-sequential accesses, wherein stored data need not be over-written or read in a particular order. Of course, such details and advantages of nonvolatile, sub-block accessible cache memory are merely examples, and claimed subject matter is not so limited.

In an embodiment, a computing system may include a memory controller to receive instructions from a processor and to perform various operations to access one or more memories. Such a computing system may also include a data management layer. For example, a processor executing an application such as a data management layer may issue a read command to retrieve stored information from a main memory and/or a cache memory. In one implementation, a memory controller may comprise at least one interface to connect to a cache PCM. Such a memory controller may operate using electronic circuitry and/or software, for example. In another implementation, such a memory controller may receive a command from a processor to retrieve particular information from a non-sub-block accessible nonvolatile memory, and determine whether such particular information is stored in cache PCM. In one implementation, such a non-sub-block accessible nonvolatile memory may comprise NAND flash memory. As mentioned above, retrieving information from cache PCM, if it exists, may be faster than retrieving the same information from a non-sub-block accessible nonvolatile memory. If the particular information is not stored in cache PCM, the memory controller may retrieve the particular information from the non-sub-block accessible nonvolatile memory. On the other hand, if the particular information is stored in cache PCM, the memory controller may retrieve the particular information from cache PCM using one or more sub-block accessible addresses associated with the particular information, as described in further detail below.

In one implementation, as discussed above, if particular information to be retrieved is not stored in cache PCM, then a memory controller may determine whether to store the particular information in cache PCM. Whether the memory controller performs a write operation to store the particular information in cache PCM may be determined based, at least in part, on a history of accesses pertaining to the particular information. For example, an historical count of read accesses for the particular information may indicate whether such particular information is likely to be accessed again in the near-future. Such a count may comprise quantity and/or frequency, for example. In such a case, storing such particular information in PCM cache may allow faster retrieval compared to merely storing the particular information in a non-sub-block accessible nonvolatile memory. In an implementation, such a historical count of read accesses may be maintained in the non-sub-block accessible nonvolatile memory, though claimed subject matter is not so limited. In another implementation, a historical count of program accesses, such as write, erase, or delete, may be used to determine whether particular information is to be written to cache PCM In yet another implementation, a user may request to permanently store particular information in cache PCM. Such a request may effectively increase a utilizable size of a main memory, for example, since a portion of the main memory need not be reserved for such particular information.

FIG. 1 is a schematic block diagram of a computing system 100, according to an embodiment. A memory controller 110 may include an interface to receive instructions from a processor 105 to access memory 130. In a particular implementation, memory 130 may comprise non-sub-block accessible nonvolatile memory 133 and cache PCM 136. For example, memory 133 may comprise NAND flash memory. Further, memory 133 may comprise main memory for processor 105. Here, main memory refers to memory that may be used by a processing entity to maintain one or more applications that are executable by the processing entity, though claimed subject matter is not limited in this respect. In an implementation, particular portions of main memory may be accessed by such a processing entity by directly addressing such particular portions, for example.

In one implementation, memory controller 110 may include a portion 120 comprising hardware and/or software to perform read/write/erase access operations on cache PCM 136. For example, such hardware and/or software provide sub-block accessible addressing (e.g., bit-wise, byte-wise, or word-wise addressing are among a number of possibilities) to access cache PCM 136. In contrast, for example, a memory controller may otherwise provide addressing to access blocks and/or sectors at a time (e.g., block-wise addressing). Thus, as mentioned above, accessing cache PCM 136 may involve accessing merely a number of memory cells that substantially match the memory size of the data to be accessed. Accessing information from cache PCM 136 may be faster than accessing the same information from a non-sub-block accessible nonvolatile memory 133.

In an embodiment, processor 105 may issue a read command to retrieve information stored in main memory 133 and/or cache memory 136. Memory controller 110 may determine whether information to be retrieved is stored in cache PCM 136. If the information is not stored in cache PCM 136, memory controller 110 may retrieve the information from main memory 133. On the other hand, if the information is stored in cache PCM 136, memory controller 110 may retrieve the information from cache PCM 136 using one or more sub-block accessible addresses generated by memory controller portion 120, for example, and associated with the information.

In one implementation, sub-block accessible (e.g., byte-wise) addressing may be used to search cache PCM 136 to search for cache data to be flushed. Examples of such flushing may be included in process 300 and/or 400 that are explained in detail below.

In an implementation, memory 130 may comprise a single die or integrated circuit chip on which non-sub-block accessible nonvolatile main memory 133 and cache PCM 136 may be co-located. In such an implementation, however, a cache PCM 136 may be distinct from non-sub-block accessible nonvolatile main memory 133 so that cache PCM 136 and non-sub-block accessible nonvolatile main memory 133 may be separately accessed by processor 105 via memory controller 110. In another implementation, non-sub-block accessible nonvolatile main memory 133 and cache PCM 136 may be located on separate dies or integrated circuit chips. Of course, such details of computing system 100 are merely examples, and claimed subject matter is not so limited.

Figure 2:
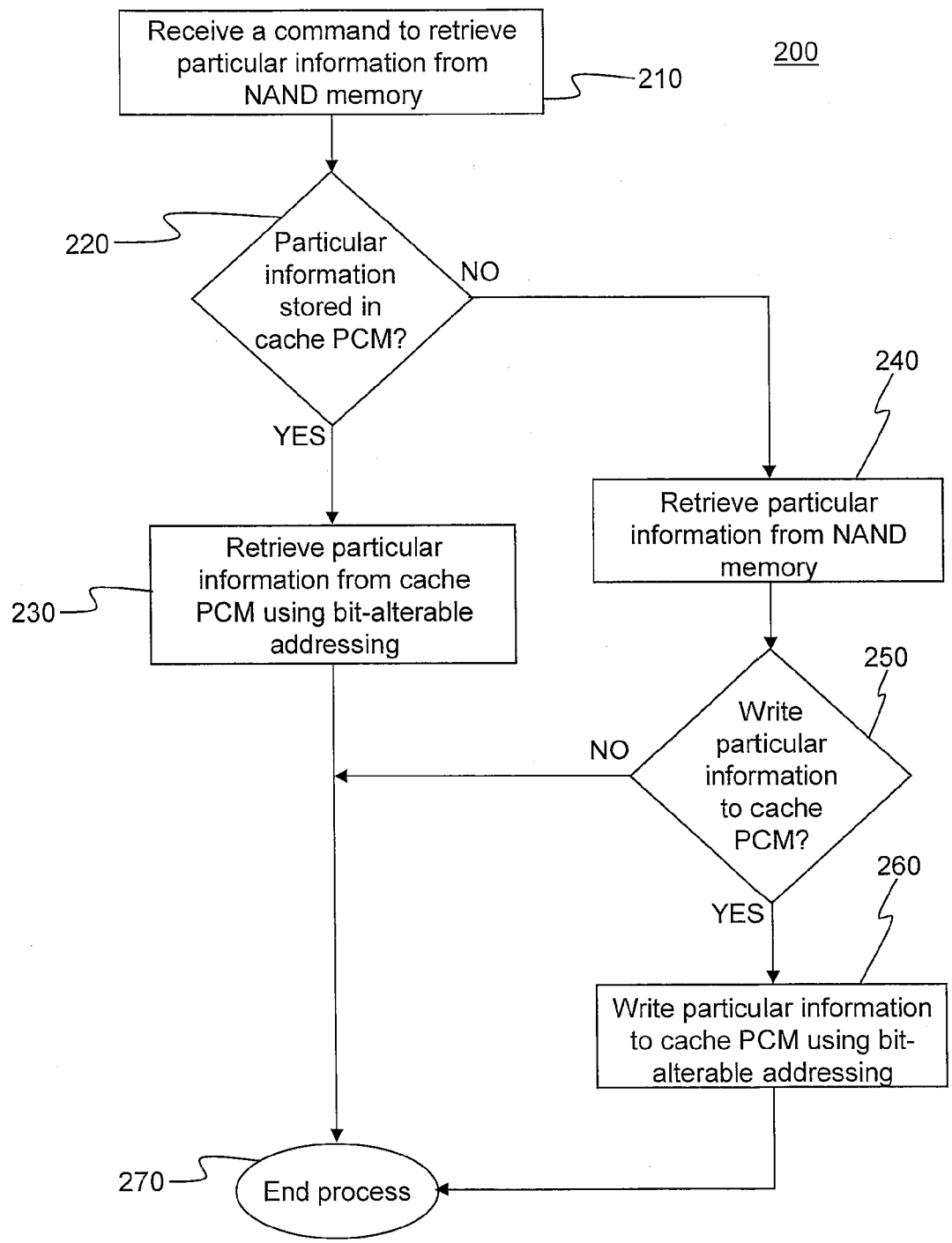
FIG. 2 is a flow diagram of a memory read process, according to an embodiment.

FIG. 2 is a flow diagram of a memory read process 200, according to an embodiment. Such a process may be performed by computing system 100, for example. At block 210, a read command to retrieve particular information from a main memory may be received by a controller, for example. In one implementation, main memory may comprise NAND flash memory, though claimed subject matter is not so limited. For example, a processor executing an application may issue such a read command to retrieve stored information from main memory. At diamond 220, a determination may be performed as to whether particular information to be retrieved is stored in cache PCM. As discussed above, retrieving information from cache PCM, if such information exists in the cache PCM, may be faster than retrieving the same information from a non-sub-block accessible main memory. If the particular information is stored in cache PCM, then process 200 may proceed to block 230 where the memory controller may retrieve the particular information from cache PCM using one or more sub-block accessible addresses associated with the particular information. For example, a memory controller may provide one or more sub-block accessible addresses to a cache PCM to access one or more particular memory cells of the cache PCM. On the other hand, if the particular information is not stored in cache PCM, then process 200 may proceed to block 240 where the memory controller may retrieve the particular information from the non-sub-block accessible main memory (e.g., NAND flash memory).

At diamond 250, if particular information to be retrieved is not stored in cache PCM, then a memory controller may determine whether to store the particular information in cache PCM. As discussed above, whether a memory controller performs a write operation to store the particular information in cache PCM may be determined based, at least in part, on a history of accesses pertaining to the particular information. For example, an historical count may comprise quantity and/or frequency of earlier commands to read the particular information. In such a case, storing such particular information in PCM cache may allow faster retrieval compared to merely storing the particular information in a non-sub-block accessible main memory. In another implementation, a memory controller may perform a write operation to store the particular information in cache PCM in response to instructions from a processor and/or memory controller to do so. If a determination is made to not write particular information into cache PCM, process 200 may terminate at ellipse 270. On the other hand, if a determination is made to write particular information into cache PCM, process 200 may proceed to block 260 to write the particular information into cache PCM using sub-block accessible addressing, for example. For example, a memory controller may provide particular information and corresponding one or more sub-block accessible addresses to a cache PCM to program one or more particular memory cells of the cache PCM. Of course, details of such a memory read process are merely examples, and claimed subject matter is not so limited.

Figure 3:
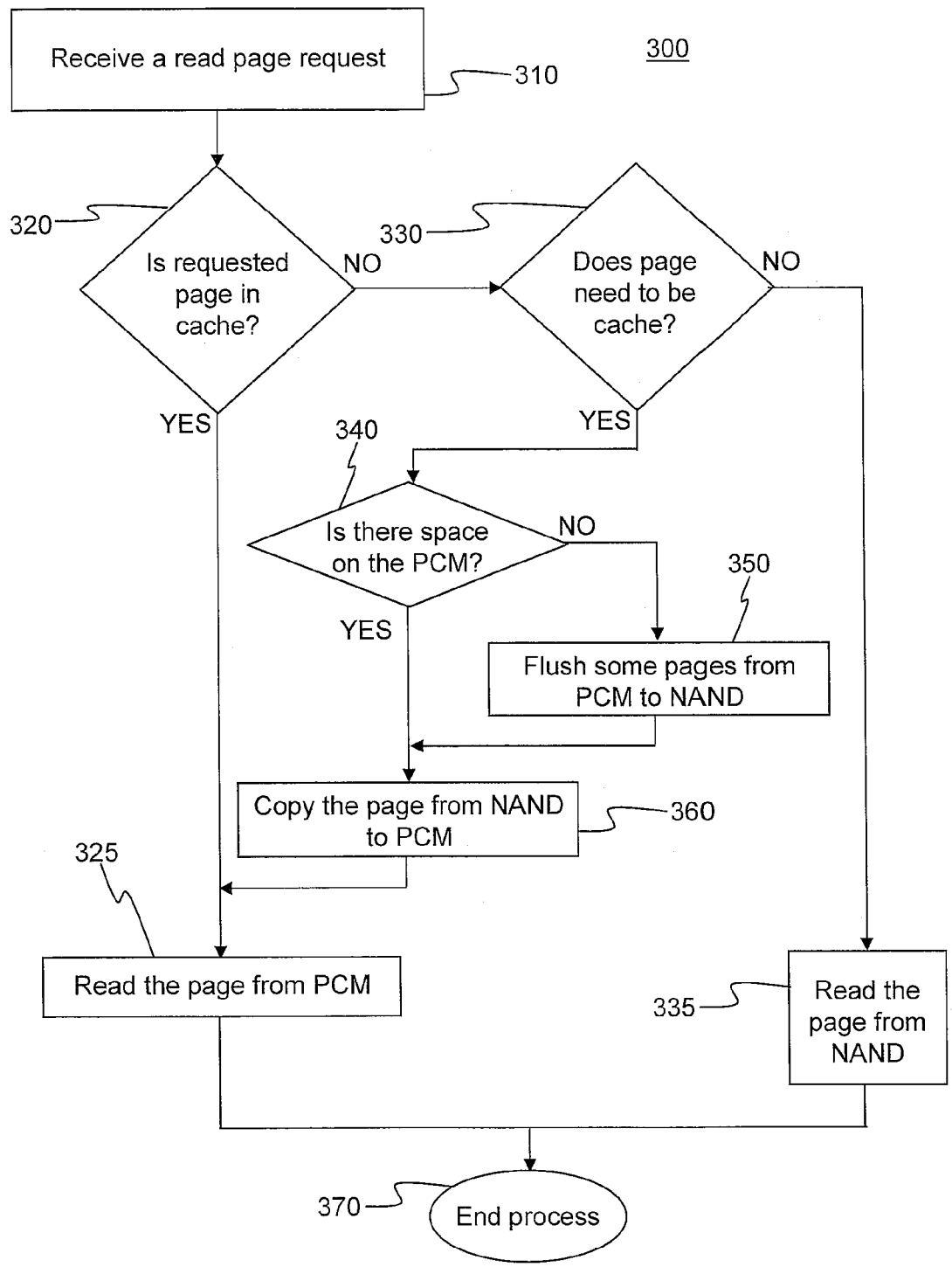
FIG. 3 is a flow diagram of a memory read process, according to another embodiment.

FIG. 3 is a flow diagram of a memory read process, according to another embodiment. Such a process may be performed by computing system 100, for example. At block 310, a read page request to retrieve a particular page of information from a main memory may be received by a data management layer (e.g., see FIG. 5), for example. In one implementation, main memory may comprise NAND flash memory, though claimed subject matter is not so limited. For example, a processor executing an application may issue such a read page request to retrieve stored information from main memory. At diamond 320, a determination may be performed as to whether particular information to be retrieved is stored in cache PCM. As discussed above, retrieving information from cache PCM, if such information exists in the cache PCM, may be faster than retrieving the same information from a non-sub-block accessible main memory. If the particular page of information is stored in cache PCM, then process 300 may proceed to block 325 where the data management layer may retrieve the particular page of information from cache PCM using one or more sub-block accessible addresses associated with the particular information. For example, a memory controller may provide one or more sub-block accessible addresses to a cache PCM to access one or more particular memory cells of the cache PCM. On the other hand, if the particular page of information is not stored in cache PCM, then process 300 may proceed to diamond 330 where the data management layer may determine whether the requested page of information should be placed in cache. Such a determination may be based, at least in part, on tracked read accesses as explained above, for example. If the requested page of information is not to be placed in cache, then process 300 may proceed to block 335, where the requested page of information may be read from a NAND memory. On the other hand, if the requested page of information is to be placed in cache, then process 300 may proceed to diamond 340, where the data management layer may determine whether the cache PCM has space for the requested page of information. If not, then process 300 may proceed to block 350, where some pages may be flushed from the PCM cache to the NAND memory. On the other hand, if the cache PCM has adequate space, then process 300 may proceed to block 360, where the requested page of information may be copied from the NAND memory to the cache PCM. Process 300 may then proceed to block 325, where the requested page of information may be read from the cache PCM. Process 300 may end at oval 370. Of course, details of such a memory read process are merely examples, and claimed subject matter is not so limited.

Figure 4:
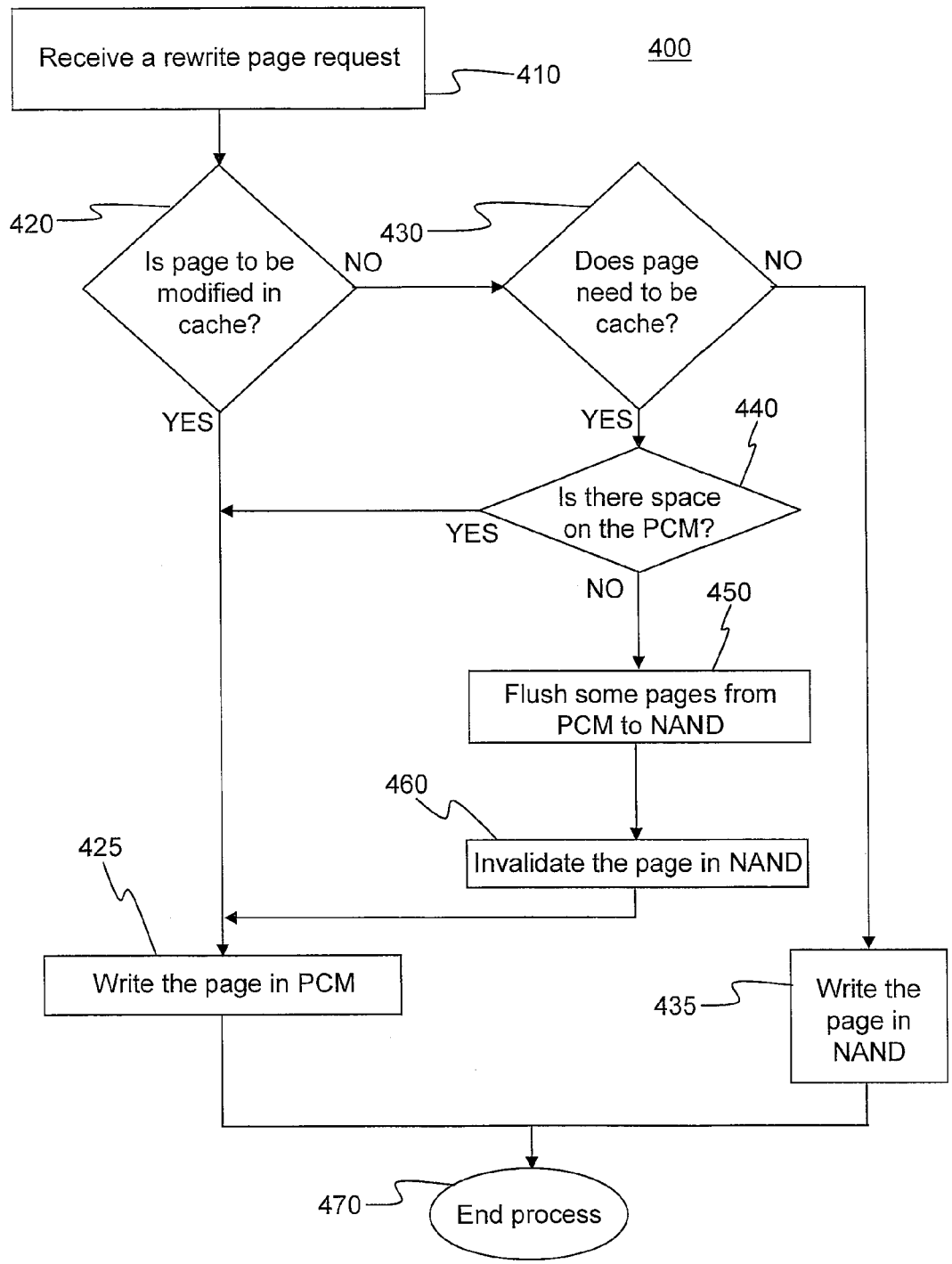
FIG. 4 is a flow diagram of a rewrite process, according to an embodiment.

FIG. 4 is a flow diagram of a rewrite process, according to an embodiment. Such a process may be performed by computing system 100, for example. At block 410, a rewrite page request to rewrite a particular page of information to a main memory may be received by a data management layer (e.g., see FIG. 5), for example. In one implementation, main memory may comprise NAND flash memory, though claimed subject matter is not so limited. For example, a processor executing an application may issue such a rewrite page request to rewrite information to main memory. At diamond 420, a determination may be performed as to whether particular information to be rewritten is stored in cache PCM. If the particular page of information is stored in cache PCM, then process 400 may proceed to block 425 where the data management layer may rewrite the particular page of information to cache PCM using one or more sub-block accessible addresses associated with the particular information. On the other hand, if the particular page of information is not stored in cache PCM, then process 400 may proceed to diamond 430 where the data management layer may determine whether the requested page of information should be placed in cache. Such a determination may be based, at least in part, on tracked rewrite accesses as explained above, for example. If the requested page of information is not to be placed in cache, then process 400 may proceed to block 435, where the requested page of information may be rewritten to a NAND memory. On the other hand, if the requested page of information is to be placed in cache, then process 400 may proceed to diamond 440, where the data management layer may determine whether the cache PCM has space for the requested page of information. If not, then process 400 may proceed to block 450, where some pages may be flushed from the PCM cache to the NAND memory. On the other hand, if the cache PCM has adequate space, then process 400 may proceed to block 460, where the requested page of information may be invalidated in the NAND memory. Process 400 may then proceed to block 425, where the requested page of information may be rewritten to the cache PCM. Process 400 may end at oval 470. Of course, details of such a memory rewrite process are merely examples, and claimed subject matter is not so limited.

Figure 5:
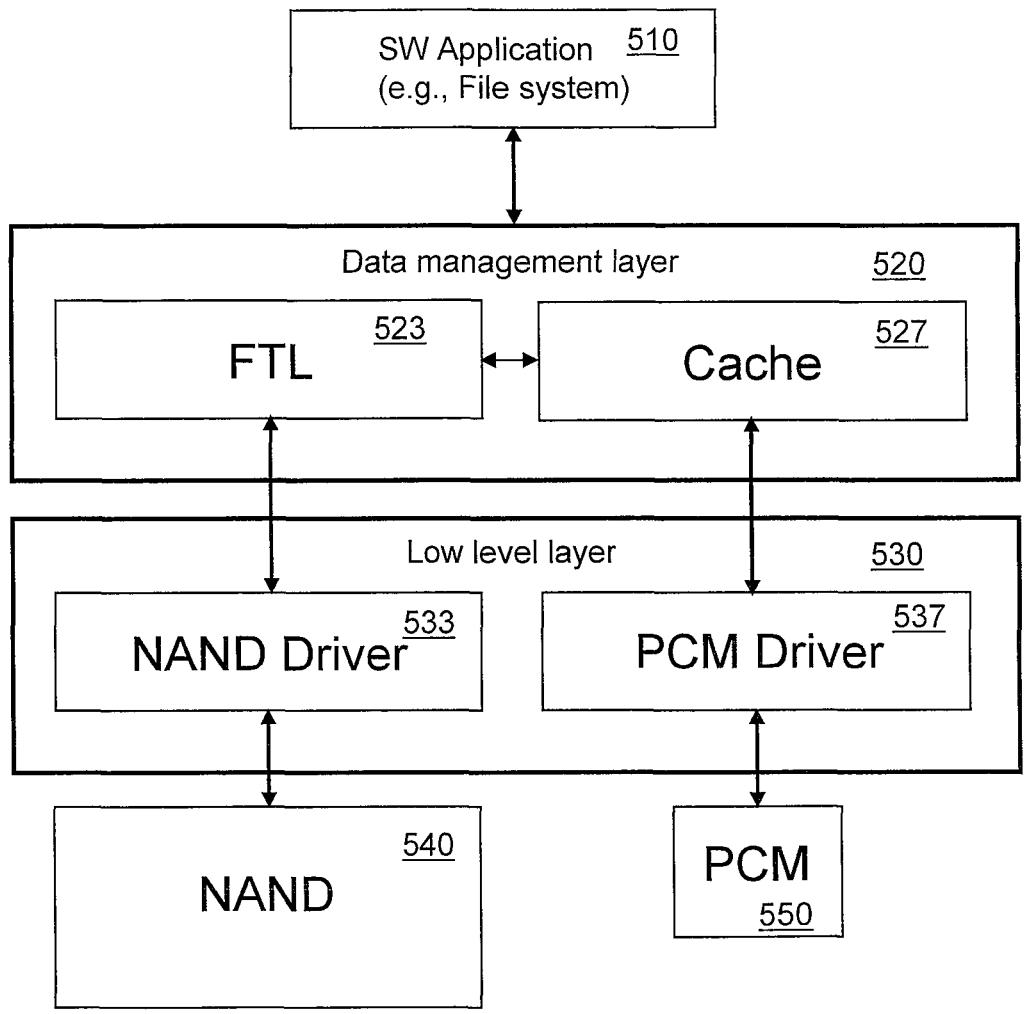
FIG. 5 is a block diagram of software architecture, according to an embodiment.

FIG. 5 is a block diagram of software architecture 500, according to an embodiment. Such software architecture may comprise a software application 510, such as a file management system, for example. Software application may be executed by computing system 100, for example. A data management layer 520 may include a flash translation layer (FTL) 523 and/or cache management 527. A low level layer 530 may include a NAND driver 533 to drive a NAND flash memory 540. Low level layer 530 may also include a PCM driver 537 to drive a cache PCM 550.

Figure 6:
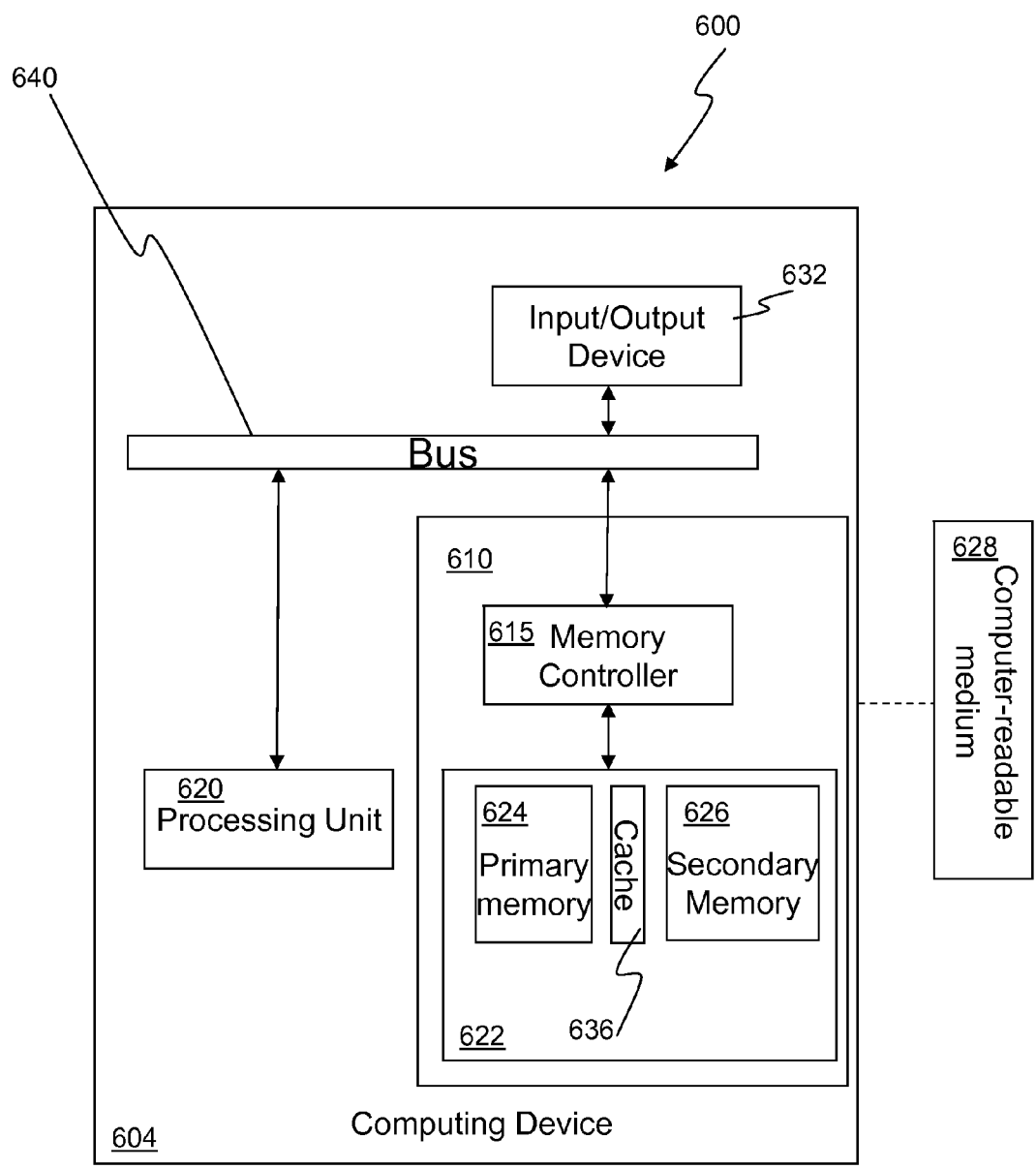
FIG. 6 is a schematic block diagram of a computing system, according to another embodiment.

FIG. 6 is a schematic diagram illustrating an exemplary embodiment of a computing system 600 including a memory device 610, which may include a main memory and cache PCM, as discussed in further detail below. A computing device 604 may be representative of any device, appliance and/or machine that may be configurable to manage memory device 610. Memory device 610 may include a memory controller 615 and a memory 622. By way of example but not limitation, computing device 604 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system; and/or any combination thereof.

It is recognized that all or part of the various devices shown in system 600, and the processes and methods as further described herein, may be implemented using or otherwise including hardware, firmware, software, or any combination thereof. Thus, by way of example but not limitation, computing device 604 may include at least one processing unit 620 that is operatively coupled to memory 622 through a bus 640 and a host or memory controller 615. Processing unit 620 is representative of one or more circuits configurable to perform at least a portion of a data computing procedure or process. By way of example but not limitation, processing unit 620 may include one or more processors, controllers, microprocessors, microcontrollers, application specific integrated circuits, digital signal processors, programmable logic devices, field programmable gate arrays, and the like, or any combination thereof. Processing unit 620 may communicate with memory controller 615 to process memory-related operations, such as read, write, and/or erase, as well as memory partition processes discussed above, for example. Processing unit 620 may include an operating system configured to communicate with memory controller 615. Such an operating system may, for example, generate commands to be sent to memory controller 615 over bus 640. Such commands may include instructions to partition at least a portion of memory 622, to associate one or more attributes to particular partitions, and to program a particular partition based at least in part on the type of data to be programmed and stored, for example.

Memory 622 is representative of any data storage mechanism. Memory 622 may include, for example, a main or primary memory 624 and/or a secondary memory 626. In a particular embodiment, memory 622 may also comprise cache PCM 636, as described above. Primary memory 624 may include, for example, a random access memory, read only memory, etc. While illustrated in this example as being separate from processing unit 620, it should be understood that all or part of primary memory 624 may be provided within or otherwise co-located/coupled with processing unit 620.

Secondary memory 626 may include, for example, the same or similar type of memory as primary memory and/or one or more data storage devices or systems, such as, for example, a disk drive, an optical disc drive, a tape drive, a solid state memory drive, etc. In certain implementations, secondary memory 626 may be operatively receptive of, or otherwise configurable to couple to, a computer-readable medium 628. Computer-readable medium 628 may include, for example, any medium that can carry and/or make accessible data, code and/or instructions for one or more of the devices in system 600.

In a particular embodiment, computing system 600 may include memory device 624 comprising a non-sub-block accessible nonvolatile memory and a cache PCM 636. In one implementation, such a non-sub-block accessible nonvolatile memory may comprise NAND flash memory. Memory controller 615 may perform a process that includes receiving a command to retrieve particular information from non-sub-block accessible nonvolatile memory 624, and determining whether the particular information is stored in cache PCM 636. If the particular information is not stored in cache PCM 636, memory controller 615 may retrieve the particular information from non-sub-block accessible nonvolatile memory 624. On the other hand, if the particular information is stored in cache PCM 636, then memory controller 615 may retrieve the particular information from cache PCM 636 using a sub-block accessible address associated with the particular information. Computing system 600 may also include a processor to host one or more applications and to initiate commands to memory controller 615 to provide access to non-sub-block accessible nonvolatile memory 624 and/or cache PCM 636.

Computing device 604 may include, for example, an input/output 632. Input/output 632 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 632 may include an operatively configured display, speaker, keyboard, mouse, trackball, touch screen, data port, etc.

In the above detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some portions of the detailed description above describe operations or processes involving physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In one example, such a special purpose computer or special purpose electronic computing device may comprise a general purpose computer programmed with instructions to perform one or more specific functions. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

The terms, "and," "and/or," and "or" as used herein may include a variety of meanings that will depend at least in part upon the context in which it is used. Typically, "and/or" as well as "or" if used to associate a list, such as A, B or C, is intended to mean A, B, and C, here used in the inclusive sense, as well as A, B or C, here used in the exclusive sense. Reference throughout this specification to "one embodiment" or "an embodiment" means that a particular feature, structure, or characteristic described in connection with the embodiment is included in at least one embodiment of claimed subject matter. Thus, the appearances of the phrase "in one embodiment" or "an embodiment" in various places throughout this specification are not necessarily all referring to the same embodiment. Furthermore, the particular features, structures, or characteristics may be combined in one or more embodiments. Embodiments described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An electronically-implemented method of caching data, the method comprising:
    receiving a command to retrieve particular information from a non-sub-block accessible nonvolatile memory; and
    retrieving said particular information from a cache phase change memory (PCM) using a sub-block accessible address associated with said particular information;
    maintaining a history of read accesses for said particular information by:
        counting said read accesses for said particular information; and
        storing results of said counting in said non-sub-block accessible nonvolatile memory; and
    if said particular information is not stored in said cache PCM, determining whether to store said particular information in said cache PCM, said determining based, at least in part, on said results of said counting.

2. The method of claim 1, further comprising:
    determining whether said particular information is stored in said cache PCM by discretely addressing said cache PCM to search for said particular information.

3. The method of claim 1, further comprising:
    if said particular information is not stored in said cache PCM,
    determining whether to store said particular information in said cache PCM, said determining based, at least in part, on a user request to permanently cache said particular information.

4. The method of claim 1, further comprising:
if said particular information is not stored in said cache PCM,
retrieving said particular information from said non-sub-block accessible nonvolatile memory.

5. The method of claim 1, wherein said non-sub-block accessible nonvolatile memory comprises NAND or NAND-based flash memory.

6. The method of claim 1, wherein said non-sub-block accessible nonvolatile memory and said cache PCM are both located on a single die.

7. The method of claim 1, further comprising:
discretely addressing said cache PCM to search for cache data to be flushed; and
flushing said cache data to be flushed.

8. A non-volatile memory controller comprising:
at least one interface configured to connect to a cache phase change memory (PCM); and
electronic circuitry configured to:
receive a command to retrieve particular information from a non-sub-block accessible nonvolatile memory;
retrieve said particular information from said cache PCM using a sub-block accessible address associated with said particular information; and
if said particular information is not stored in said cache PCM, determine whether to store said particular information in said cache PCM, said determining based, at least in part, on a historical count of read accesses for said particular information.

9. The non-volatile memory controller of claim 8, said electronic circuitry configured to:
discretely address said cache PCM to search for said particular information.

10. The non-volatile memory controller of claim 8, wherein said historical count is maintained in said non-sub-block accessible nonvolatile memory.

11. The non-volatile memory controller of claim 8, further comprising:
if said particular information is not stored in said cache PCM,
determine whether to store said particular information in said cache PCM, said determining based, at least in part, on a user request to permanently cache said particular information.

12. The non-volatile memory controller of claim 8, wherein said non-sub-block accessible nonvolatile memory comprises NAND or NAND-based flash memory.

13. A system comprising:
a memory device comprising a non-sub-block accessible nonvolatile memory and a cache phase change memory (PCM);
a memory controller configured to:
receive a command to retrieve particular information from said non-sub-block accessible nonvolatile memory; and
retrieve said particular information from said cache PCM using a sub-block accessible address associated with said particular information;
if said particular information is not stored in said cache PCM, determine whether to store said particular information in said cache PCM, said determining based, at least in part, on a historical count of read accesses for said particular information; and
a processor configured to host one or more applications and to initiate said command to said memory controller to provide access to said non-sub-block accessible nonvolatile memory and/or said cache PCM.

14. The system of claim 13, wherein said historical count is maintained in said non-sub-block accessible nonvolatile memory.

* * * * *